(12) United States Patent
Hutton et al.

(10) Patent No.: US 6,931,687 B2
(45) Date of Patent: Aug. 23, 2005

(54) FLEXIBLE OVER THE WING PASSENGER LOADING BRIDGE

(75) Inventors: Neil Hutton, Ottawa (CA); Christopher Nowak, Ottawa (CA)

(73) Assignee: DEW Engineering and Development Limited, Ottawa (CA)

(*) Notice: Subject to any disclaimer, the term of this patent is extended or adjusted under 35 U.S.C. 154(b) by 158 days.

(21) Appl. No.: 10/354,003

(22) Filed: Jan. 30, 2003

(65) Prior Publication Data

US 2003/0145401 A1 Aug. 7, 2003

Related U.S. Application Data

(62) Division of application No. 10/076,399, filed on Feb. 19, 2002, now Pat. No. 6,526,615.
(60) Provisional application No. 60/352,850, filed on Feb. 1, 2002.

(51) Int. Cl.$^7$ ................................................. B64F 1/305
(52) U.S. Cl. ................................................. 14/71.5; 14/71.7
(58) Field of Search ........................ 14/71.1, 69.5, 14/71.3, 71.5, 71.7, 72.5; 702/150, 151, 159; 382/104

(56) References Cited

U.S. PATENT DOCUMENTS

| | | | | |
|---|---|---|---|---|
| 3,184,772 A | * | 5/1965 | Moore et al. | 14/71.5 |
| 3,524,207 A | * | 8/1970 | Giarretto | 14/71.5 |
| 3,538,529 A | * | 11/1970 | Breier | 14/71.5 |
| 3,722,017 A | * | 3/1973 | Gacs et al. | 14/71.5 |
| 3,729,262 A | * | 4/1973 | Snead et al. | 356/153 |
| 3,808,626 A | * | 5/1974 | Magill | 14/71.5 |
| D327,951 S | | 7/1992 | Anderberg | |
| 5,424,746 A | * | 6/1995 | Schwab et al. | 342/49 |
| 5,675,661 A | * | 10/1997 | Richman et al. | 382/104 |
| 6,100,964 A | * | 8/2000 | De Cremiers | 356/4.01 |
| 6,324,489 B1 | * | 11/2001 | Millgard | 702/151 |
| 6,496,996 B1 | * | 12/2002 | Worpenberg et al. | 14/71.5 |
| 6,545,601 B1 | * | 4/2003 | Monroe | 340/521 |
| 6,563,432 B1 | * | 5/2003 | Millgard | 340/961 |

FOREIGN PATENT DOCUMENTS

| | | | | |
|---|---|---|---|---|
| DE | 10046010 A1 | * | 3/2002 | B64F/1/305 |
| WO | WO 9847764 A2 | * | 10/1998 | B64F/1/305 |
| WO | WO 9942365 A1 | * | 8/1999 | B64D/9/00 |
| WOWO | PCT/CA03/00221 | | 9/2004 | |

OTHER PUBLICATIONS

"Dual bridges may shorten Southwest's turnaround" Dallas Business Journal, May 22, 2000.
"Easy come, easy go" AE & T Autumn 2001, pp 3–5.
Fabriksmonteringin Trelleborg AB website: http://www.fmt.se (pages of particular relevance attached).
Information relating to possible public use (see attached photos).

(Continued)

Primary Examiner—Thomas B. Will
Assistant Examiner—Alexandra K. Pechhold
(74) Attorney, Agent, or Firm—Freedman & Associates

(57) ABSTRACT

Apparatus for moving passengers between an airport terminal building and a doorway of an aircraft located rearward of a wing of the aircraft which includes a passageway member pivotally anchored to one of the terminal building and a passenger loading bridge for servicing a front doorway of a same aircraft. The apparatus includes a telescopic passageway member that is pivotally mounted to the passageway member via a flexible connection. In use, the apparatus is cantilevered over the wing of an aircraft with the flexible connection substantially above a highest point along an upper surface of the aircraft wing. The flexible connection allows a cabin carried at an outboard end of the telescopic passageway member to mate to the rear doorway of the aircraft, providing an open passageway between the rear doorway and the terminal building through which passengers deplane. Positioning the flexible connection above the high point of the wing approximately minimizes the inclination of each passageway member floor surface.

20 Claims, 9 Drawing Sheets

OTHER PUBLICATIONS

"Southwest Takes Back Door to Beat Deplaning Record" Texas Journal, date unknown.

"Southwest Tests First Narrowbody Dual Boarding Bridges" Business Week Daily, date unknown.

"Southwest tests twin loading system; airline trying dual boarding of passengers at Love Field" Star–Telegram ~ Mar. 7, 2000.

Airbus Industrie, France. Brochure entitled "A3XX Ground Operations." Publication date unknown, appears to be a confidential publication containing proprietary information and not for public distribution. Printed in France. Drawing at p. 59 is of interest.

Airbus Industrie, France. Brochure entitled "Upper Deck Servicing." Publication date unknown, appears to be a confidential publication containing proprietary information and not for public distribution. Printed in France. Drawing at p. 59 is of interest.

Holly Hegeman, "Wing Tips." http://www.planebusiness.com/tscolumns/ts052800.htm, Report originally appeared in TheStreet.com on May 28, 2000. Two paragraphs in the middle of p. 2.

Udara Fernando, "What's Up, Doc?" http://daily.stanford.edu/daily/servlet/tempo?page=printable&repository=0001_article&id=5832, Stanford Daily, May 30, 2001. Third paragraph of the publication.

Author unknown. "'All Aboard' Times Two." http://www.tribuneindia.com/2001/20010927/science.htm, published Chandlgarh, India, Sep. 27, 2001.

Author unknown, FMT Aircraft Gate Support Systems AB, Sweden. "Dual Boarding Bridge System for Boeing 737 and Airbus 319–321." Undated FMT document. It is not known whether this document was for public distribution.

* cited by examiner

FLEXIBLE OVER THE WING PASSENGER LOADING BRIDGE

This application is a divisional of application Ser. No. 10/076,399, filed on Feb. 19, 2002, now U.S. Pat. No. 6,526,615, which claims the benefit of Provisional Application No. 60/352,850 filed Feb. 1, 2002.

FIELD OF THE INVENTION

The present invention relates generally to passenger loading bridges and more particularly to a flexible over-the-wing passenger loading bridge for servicing a rear doorway of a nose-in parked aircraft.

BACKGROUND OF THE INVENTION

In order to make aircraft passengers comfortable, and in order to transport them between an airport terminal and an aircraft in such a way that they are protected from weather and other environmental influences, passenger loading bridges are used which can be telescopically extended and the height of which is adjustable. For instance, an apron drive bridge in present day use comprises a plurality of adjustable modules, including: a rotunda, a telescopic tunnel, a bubble section, a cab, and elevating columns with wheel carriage. Manual, semi-automated and automated bridge alignment systems are known for adjusting the position of the passenger loading bridge relative to an aircraft, for instance to compensate for different sized aircraft and to compensate for imprecise parking of an aircraft at an airport terminal, etc. Of course, other types of bridges are known in the art, such as for example nose loaders, radial bridges and pedestal bridges.

Unfortunately, aircraft aisle design is such that passenger flow rate along aircraft aisles is a limiting factor, which slows down the entire deplaning operation. That is, the aircraft doorways and most passenger loading devices are capable of handling substantially higher passenger flow rates than are the aircraft aisles. Of course, similar delays are also encountered during the boarding, or enplaning, operation. This limitation is of serious concern in a marketplace where airlines consistently struggle to shorten the turn-around time of their aircraft in order to boost operating efficiency, lower operating costs and thereby offer lower fares to their customers.

Accordingly, there has been much interest over the past several decades in developing ways of servicing plural doorways of a same aircraft, in order to reduce the length of time that is required to complete the boarding and deplaning operations for said aircraft. Although it is known to service more than one doorway in front of the wing of some types of large aircraft, for example using two separate apron drive bridges to service two different doorways, the actual time savings are nominal because some passengers must still traverse a long stretch of in-plane aisle in order to reach the nearer of the two different doorways.

Some types of aircraft include a rear door through which passengers can enter and leave the aircraft by means of steps that are lowered from the aircraft onto the apron or tarmac, or by means of mobile steps that are connected to the door by ground personnel. One drawback with this approach is that it is necessary for passengers to walk onto the apron and then walk up steps into the passenger bridge. As will be obvious to one of skill in the art, it is not desirable for passengers to occupy the apron surrounding an aircraft, because of the safety risks involved. Additionally, accessibility may be a concern for some passengers, such as for instance a passenger using a wheelchair.

An improved system for servicing a doorway behind or over the wing of aircraft equipped with such a doorway is required. In particular, many smaller types of aircraft, such as for instance narrow body aircraft, have only a single aisle along which passengers are able to traverse the distance between the front of the aircraft and the last row of seats in the back of the aircraft. By servicing the rear doorway, the length of in-plane aisle which the passenger must traverse may be reduced substantially, for example by a factor of up to two, with a corresponding reduction of the boarding and/or deplaning time. This is particularly desirable in the case of "stretch" models of aircraft, in which the length of in-plane aisle that must be traversed by passengers can be quite significant. This reduction in boarding and/or deplaning time not only avoids adverse passenger reaction, but also substantially increases safety during situations requiring fast deplaning as in the case of a fire on the ramp or in the aircraft at the terminal.

There have been two basic techniques of positioning aircraft alongside passenger terminals to permit interconnection of the aircraft and the terminal using passenger bridges; these two techniques are parallel parking and nose-in parking. Parallel parking offers the advantages that the aircraft arrives and departs from its parked position under its own power, and thus requires no tow tractor in its turnaround cycle. Further, the orientation of the aircraft with respect to the terminal facade in parallel parking facilitates access to aircraft doorways either forward of or aft of the wing with known ramp supported loading bridges. Moore et al. in U.S. Pat. No. 3,184,772, issued May 25, 1965, disclose a telescoping loading and unloading structure for servicing doorways forward of and aft of the wing of an aircraft parked in parallel relationship to a terminal building.

However, parallel parking presents one very significant disadvantage. Parallel parking necessitates certain aircraft turning and maneuvering room, and therefore this technique requires greater terminal facade length than does the nose-in technique. Another disadvantage of parallel parking is that departure of an aircraft from a parked parallel position requires substantial engine thrust to start and turn the aircraft. As the aircraft departs, the exhaust of the aircraft engines is directed toward the terminal building and toward the ground equipment and personnel located adjacent the terminal with a resultant shaking of the terminal building and disruption of ground operation activities.

In view of these disadvantages, most modern terminals utilize nose-in aircraft parking. However, with nose in parking, it is generally necessary to cantilever or otherwise move a passenger loading bridge structure directly over the aircraft wing in order to service the rear doorway. One exception is U.S. Pat. No. 3,808,626 issued to Magill on May 7, 1974, in which a self contained mobile passenger loading bridge for airplane loading and unloading operations is disclosed. The bridge comprises a three section telescopic passageway, which is pivotally connected to a terminal building at an inboard end via a stationary rotunda and to a moveable rotunda at an outboard end. A second, two section telescopic passageway is pivotally connected to the moveable rotunda at an inboard end thereof and has a cabin at an outboard end thereof for engaging a rear doorway of an aircraft. The bridge is essentially an elongated conventional apron drive bridge having an additional pivot point, i.e. the moveable rotunda, for steering the outboard end behind the wing of a nose-in parked aircraft in order to mate the cabin to a rear doorway of the aircraft.

U.S. Pat. No. 3,524,207 issued to Giarretto Aug. 18, 1970 discloses an over-the-wing access structure for servicing multiple doors in commercial jet aircraft. The height of the structure is vertically adjustable in a level manner so as to accommodate vertical movement of the aircraft during loading and unloading. This system is both awkward and expensive. Furthermore, should power to the structure be interrupted when the outboard supports are deployed, it becomes impossible to move the aircraft away from the terminal building due to the supports blocking the path of the wings.

U.S. Pat. No. 3,538,529 issued to Breier on Nov. 10, 1970 discloses an overhead supported aircraft loading bridge, including a slightly arched telescoping tunnel section, which may be cantilevered over the wing of an aircraft for servicing a rear doorway thereof. The telescoping tunnel section is pivotally connected to a static structure, thereby providing additional freedom of vertical motion for clearing the wing and mating to the rear door of the aircraft. This system also is both awkward and expensive. It is a further disadvantage of this system that the overhead support arm must support the weight of the entire loading bridge. Accordingly, the loading bridge of US '529 is particularly unsuitable for use with "stretch" aircraft models, which models have rear doorways that are serviceable only using loading bridges having three telescoping tunnel sections. As will be obvious to one skilled in the art, an additional tunnel section would add unacceptably to the weight of the loading bridge disclosed by Breier.

U.S. Pat. No. 3,722,017 issued to Gacs et al. on Mar. 27, 1973 discloses an over-the-wing aircraft loading bridge having a main passageway member pivotally supported at the terminal building end on a track mounted rack propelled carriage. The main passageway member is elevatable and depressable so that its outer end portion, slightly arched, may extend over the wing of an aircraft. At its outer end the main passageway mounts a lateral passageway including an operator's cab, which is for being mated to a rear doorway of the aircraft. The lateral passageway appears to serve as a bridge between the rear doorway and the main passageway element, which passageway lacks sufficient freedom of vertical movement to engage the rear doorway directly. It is a disadvantage of this system that the lateral passageway, including the mechanism for adjusting same, adds considerable weight to the unsupported (i.e. outboard) end of the main passageway member. The additional complexity of aligning such a bridge would increase the time required to move the bridge into alignment with the rear doorway, thereby negating some of the desired time savings. It is a further disadvantage of the system disclosed by Gacs et al. that additional bridge operators and gate control staff are required to service the multiple doors of the aircraft. For example, each doorway of the aircraft is serviced using a separate bridge having a separate entrance into the terminal area.

Anderberg in WO 9942365 discloses an over-the-wing bridge having a telescopic tunnel section pivotally connected to a rotunda at an inboard end thereof and terminating in a cabin at an outboard end thereof. The outboard end is supported using a vertically adjustable wheel carriage, which requires the outboard end of the tunnel to be driven outward and around the wing of the aircraft. Of course, should power to the telescopic tunnel be interrupted when the rear doorway of the aircraft is engaged, it becomes impossible to move the aircraft away from the terminal building due to the wheel carriage blocking the path of the wings. Furthermore, the tunnel section is straight and therefore the floor of the cabin is at a lower level relative to the floor of the outermost tunnel section. Although this arrangement allows the telescopic tunnel section to clear the wing of the aircraft, the steps that are necessary for connecting the two floor sections would constitute an unacceptable barrier to universal accessibility.

Kubatzki in WO 0009395 discloses an over the wing bridge including at least one horizontally pivotal extension arm, which extension arm is mounted on a support. An access tunnel, including a device on the end thereof for docking to the airplane, is coupled to the extension arm. Due to the length of the cantilevered section of the passenger bridge, the extension arm and support are considerable structures. Furthermore, the support structure severely limits the ability of the bridge to pivot horizontally.

Worpenberg in WO 0055040 discloses an over-the-wing bridge including a telescopic tunnel section that can be swiveled over the wing of an aircraft and which is supported by an extension arm that is fixedly or moveably mounted on a frame. The telescopic tunnel section is straight, and as such the inboard end of the tunnel section must be at a higher level relative to the outboard end of the tunnel section in order to engage the rear doorway of an aircraft whilst maintaining acceptable clearance above the aircraft wing. This may result in the upward slope of the telescopic tunnel section toward the terminal being unacceptably steep.

FMT Aircraft Gate Support Systems of Sweden has recently implemented a dual-door, overwing loading bridge. The bridge includes a passageway extending from a rotunda and which can be cantilevered over the wing of an aircraft to mate a cabin at the outboard end of the passageway to a rear doorway of the aircraft. The passageway is supported at a variable height by an adjustable wheel carriage in front of the wing and is permanently arched at a predetermined angle. Accordingly, vertical swinging motion occurs only at a point where the bridge is mounted to a fixed structure, such as one of a rotunda and a terminal building. It is a disadvantage that for certain combinations of fixed structure access height and aircraft rear doorway position, servicing the rear doorway is awkward or impossible due to the limited vertical motion of the cabin end.

It would be advantageous to provide an over-the-wing aircraft loading bridge that overcomes the above-mentioned disadvantages associated with the prior art.

OBJECT OF THE INVENTION

In an attempt to overcome these and other limitations of the prior art it is an object of the instant invention to provide a flexible over-the-wing passenger loading bridge for servicing a rear doorway of a nose-in parked aircraft.

In an attempt to overcome these and other limitations of the prior art it is an object of the instant invention to provide a flexible over-the-wing passenger loading bridge that can be used in cooperation with a known passenger loading bridge to increase passenger flow rates to and from an aircraft.

SUMMARY OF THE INVENTION

In accordance with an aspect of the instant invention there is provided a passenger loading bridge for servicing an aircraft having a rear doorway aft of or over a wing, comprising:

a first passageway member pivotally coupled at an inboard end thereof to a rotunda and supported close to an outboard end thereof by a ground support member;

a telescopic passageway member having an inboard end and an outboard end and including at least two passageway elements, one that is telescopically received within the other such that a distance between the inboard end and the outboard end of the telescopic passageway member is variable, the telescopic passageway member for being supported in a cantilever like fashion such that, in use, the telescopic passageway member is extensible over the wing;

a flexible connection for pivotally coupling the outboard end of the first passageway member and the inboard end of the telescopic passageway member, for allowing a vertical swinging motion of the outboard end of the telescopic passageway member; and an adjustable support mechanism mounted at a first end thereof to a surface of the first passageway element and mounted at a second opposite end thereof to a surface of the telescopic passageway member, for vertically swinging the telescopic passageway member relative to the first passageway member in a controllable manner.

In accordance with an another aspect of the instant invention there is provided a passenger loading bridge for servicing an aircraft having a rear doorway aft of or over a wing, comprising:

a first passenger loading bridge having an outboard end adjustable for servicing a doorway ahead of the wing of the aircraft;

an articulated passenger loading bridge having an inboard end for being anchored to a rotunda, an outboard end for being cantilevered over the wing of the aircraft to service the rear doorway of the aircraft, and two passageway members pivotally coupled by a flexible connection disposed therebetween to allow a vertical swinging motion of one of the passageway members relative to the other one of the passageway members; and a stationary passageway element disposed between the first passenger loading bridge and the rotunda, for allowing passengers to move therebetween, wherein during use the inclination of a floor surface of each one of the two passageway members of the articulated passenger loading bridge is approximately minimized by positioning the flexible connection approximately above a highest point of the wing of the aircraft.

In accordance with yet another aspect of the instant invention there is provided a method of automatically aligning a passenger loading bridge to an aircraft having a rear doorway aft of or over a wing, comprising the steps of:

a) automatically determining a type of the aircraft;

b) retrieving information relating to an expected stopping position for the rear doorway of the determined type of the aircraft;

c) retrieving other information relating to a predetermined minimum height profile for allowing the passenger loading bridge to maintain a desired minimum safe distance relative to the wing of the aircraft;

d) waiting for the aircraft to stop;

e) automatically moving an aircraft engaging end of the passenger loading bridge toward the expected stopping position of the rear doorway for the determined type of the aircraft; and f) relatively moving outboard and inboard portions of the passenger loading bridge about a flexible connection disposed therebetween, such that during step (e) a point along the lower surface of the passenger loading bridge remains above the predetermined minimum height profile of the wing of the aircraft.

In accordance with still another aspect of the instant invention there is provided a method of aligning a passenger loading bridge having first and second aircraft engaging ports mounted at an outboard end of first and second passageway members, respectively, to an aircraft having first and second spaced apart doorways along a same side thereof, comprising the steps of:

a) automatically determining a type of the aircraft;

b) retrieving information relating to an expected stopping position of one of the first and second doorways for the determined type of the aircraft;

c) automatically moving a corresponding one of the first and second passageway members, in order to move the aircraft engaging port mounted at the outboard end thereof toward the expected stopping position of the one of the first and second doorways of the aircraft; and d) engaging the one of the first and second doorways of the aircraft using the aircraft engaging port mounted at the outboard end of the corresponding one of the first and second passageway members, to allow passengers to move therebetween.

In accordance with another aspect of the instant invention there is provided a passenger loading bridge for servicing an aircraft having a rear doorway aft of or over a wing, comprising:

a rotunda, for being anchored near an outboard end of an existing passenger loading bridge, which passenger loading bridge includes an extensible passageway for servicing a doorway ahead of the wing of the aircraft;

an articulated passenger loading bridge pivotally anchored at an inboard end thereof to the rotunda, the articulated passenger loading bridge for being cantilevered over the wing of the aircraft to service the rear doorway thereof, and having two passageway members pivotally coupled by a flexible connection disposed them to allow a vertical swinging motion of one of the passageway members relative to the other one of the passageway members, wherein during use the inclination of a floor surface of each of the two passageway members is optimized by positioning the flexible connection substantially above a highest point of the wing of the aircraft.

BRIEF DESCRIPTION OF THE DRAWINGS

Exemplary embodiments of the invention will now be described in conjunction with the following drawings, in which similar reference numbers designate similar items:

FIG. 1b is a side view of the loading bridge shown in FIG. 1a;

FIG. 2b is a side view of the loading bridge shown in FIG. 2a;

FIG. 3b is a side view of the loading bridge shown in FIG. 3a;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Throughout the detailed description and in the claims, it is to be understood that the following definitions shall be accorded to the following terms. The term 'inboard end' refers to that end of a passageway nearest a stationary structure, for instance one of a terminal building and a stationary rotunda. The term 'outboard end' refers to that end of a passageway nearest an aircraft doorway.

Figure 1A:
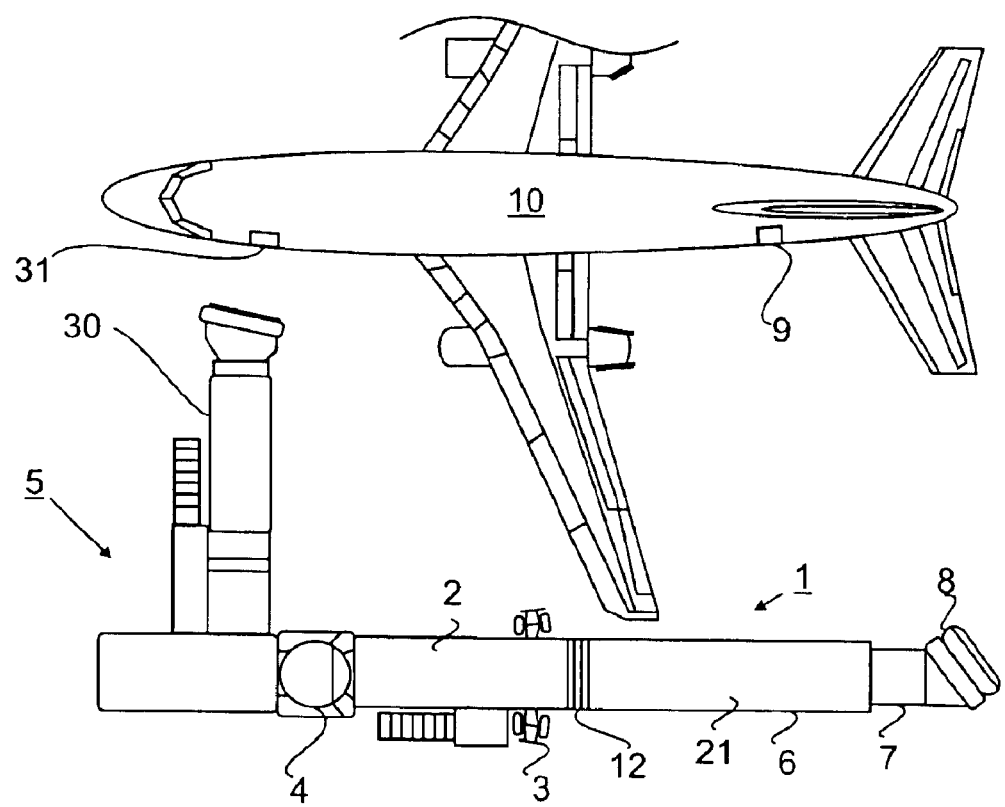
FIG. 1a is a top plan view showing a loading bridge according to the instant invention in a stowed position relative to a nose-in parked aircraft.
Figure 1B:
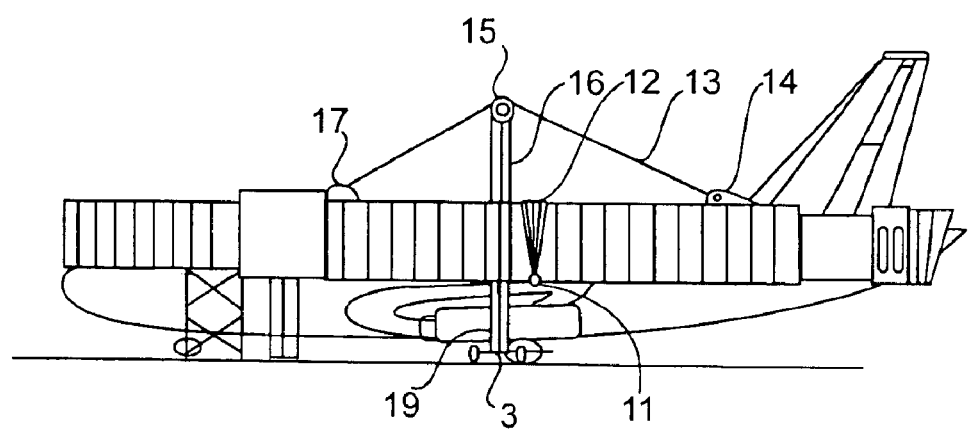

Referring to FIGS. 1a and 1b, shown is a loading bridge according to the instant invention in a stowed position relative to a nose-in parked aircraft. FIG. 1a shows a top plan view of the loading bridge. The loading bridge comprises a stationary rotunda 4 from which extends a passageway 1 ending with a pivotal cabin 8 for mating to a rear doorway 9 of an aircraft 10. The passageway 1 comprises a fixed-length passageway member 2 and a telescopic tunnel section 21. The fixed-length passageway member 2 includes a floor, two sidewalls and a ceiling. The telescopic tunnel section 21 includes outer and inner tunnel elements 6 and 7, wherein the inner element 7 is telescopically received within the outer element 6 such that the length of the tunnel section 21 is variable. Each tunnel element 6 and 7 includes a floor, two sidewalls and a ceiling. Preferably, the fixed-length passageway member 2 and the outer tunnel element 6 have substantially similar cross-sectional profiles when viewed end-on. A flexible connection including a bellows-type canopy 12 and a floor connector 11 connects the outboard end of the passageway member 2 and the inboard end of the outer tunnel element 6. The flexible canopy 12 is provided between the passageway member 2 and the outer tunnel element 6 to provide weatherproof protection to passengers passing therebetween. Optionally, the flexible connection includes a floor plate (not shown) to provide a level surface over which passengers move through the bridge. The flexible connection permits vertical swinging of the telescopic tunnel section 21 about a horizontal axis passing through the floor connector 11.

The loading bridge is for being cantilevered and extended over the wing of the nose-in parked aircraft 10 to service the rear doorway 9. Accordingly, the inboard end of the passageway member 2 is pivotally anchored to the stationary rotunda 4, preferably being at more or less the same elevation as the doorways in the aircraft 10. The passageway member 2 is supported near the outboard end thereof by a wheel carriage including a height adjustable support post 19 and drive wheels 3. The drive wheels 3 are for achieving angular displacement of the passageway 1. Additional mechanisms (not shown) are provided for slidingly extending and retracting the inner tunnel element 7 relative to the outer tunnel element 6, to thereby affect the length of the passageway 1, and for pivoting the pivotal cabin 8. The height adjustable support post 19 preferably includes one of a hydraulic cylinder, a pneumatic cylinder and a screw jack. Of course, other known mechanisms for moving the various bridge components relative to other bridge components are envisaged for use with the instant invention, selection of such mechanisms being purely a matter of design choice.

As shown in FIG. 1a, the rotunda 4 opens onto a stationary bridge structure 5 leading to a terminal building (not shown). The stationary bridge structure 5 includes a nose-loader type bridge 30 for simultaneously servicing a front doorway 31 of the aircraft 10. Optionally, the nose-loader type bridge 30 is replaced by one of a radial bridge and an apron drive bridge for simultaneously servicing a front doorway 31 of the aircraft 10. Preferably, the provided one of a nose-loader, radial and apron drive bridge is mated to the front doorway 31 of the aircraft 10 in a fully automated manner using an automated bridge alignment system (not shown). An automated bridge alignment system suitable for use with the instant invention is disclosed in co-pending U.S. patent application, Ser. No. 10/025,500, filed Dec. 26 2001 in the name of the Hutton and which is incorporated herein by reference. Further optionally, the rotunda 4 opens directly onto a terminal building concourse.

Referring to FIG. 1b, shown is a side view of the loading bridge of FIG. 1a. As shown in FIG. 1b, overhead support means are provided for raising and lowering the cabin end of the telescopic tunnel section 21. In a first preferred embodiment shown in FIG. 1b the support means comprises a cable 13 attached at a first end to a bracket 14, which bracket 14 is mounted to a roof surface near the outboard end of the outer tunnel segment 6. The cable 13 is passed over a bearing member 15, which is preferably disposed atop a support tower 16, and attached at a second end to an adjustable winch 17. The action of winding additional cable onto the winch causes the cabin-end to rise, whereas winding cable off of the winch causes the cabin-end to lower. Preferably more than one cable is used. In a most preferred embodiment, two cables are used, which provides improved stability during operation and reduces the risk of a catastrophic failure in the event that one cable fails.

Optionally, the support means comprises a cable of fixed length, which cable is attached at a first end to a bracket mounted on a roof surface near the outboard end of the outer tunnel segment 6, and at a second opposite end to a second bracket mounted near the inboard end of the fixed-length passageway member 2, The cable passes over a bearing member (not shown), which is preferably disposed atop a height adjustable support tower (not shown) mounted near the outboard end of the fixed-length passageway member 2.

Then, by extending the height adjustable support tower the cable is pushed up, thereby, causing the cabin-end to swing vertically upward. Similarly, retracting the height adjustable support tower causes the cabin-end to swing vertically downward.

Figure 2A:
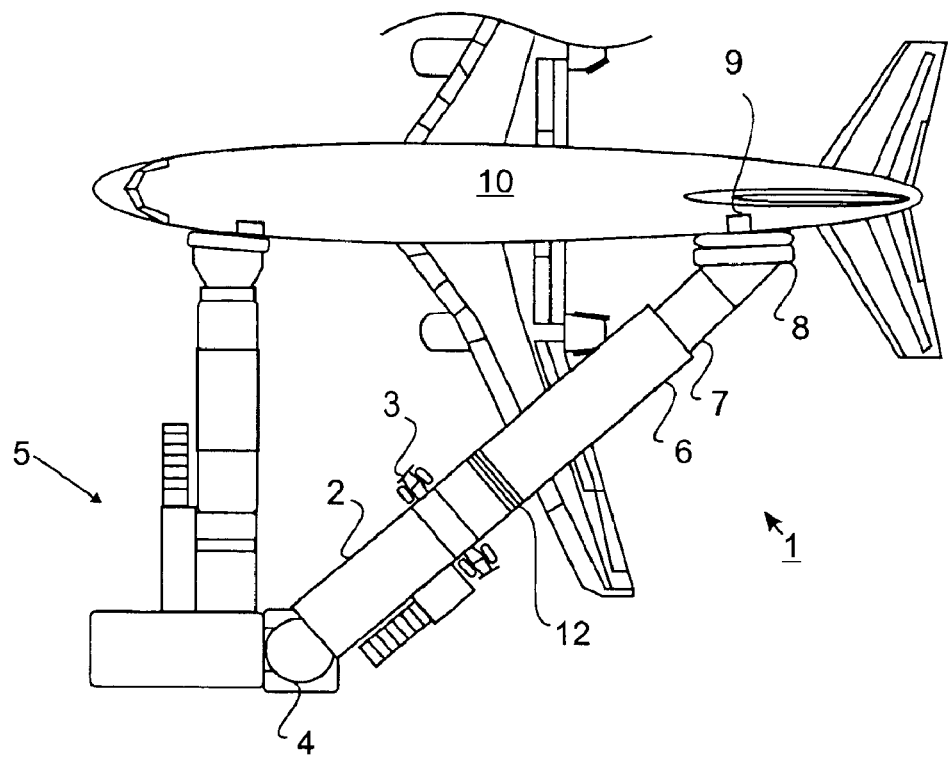
FIG. 2a is a top plan view showing a loading bridge according to the instant invention in an aircraft engaging position relative to a nose-in parked aircraft.

Referring to FIG. 2a, shown is a top plan view of a loading bridge according to the first embodiment of the instant invention in an aircraft engaging position relative to a nose-in parked aircraft. Elements labeled with the same numerals have the same function as those illustrated in FIG. 1a. The passageway 1 is cantilevered over the wing of the aircraft 10 by driving the drive wheels 3 along an arcuate path in front of the wing and in a direction generally toward the aircraft. Of course, prior to the passageway 1 being cantilevered toward the aircraft, the height adjustable support post 19 of the wheel carriage is adjusted in order to raise the passageway 1 to a height that provides a minimum safe clearance to the wing so as to avoid contact with the wing of the aircraft 10. Typically, this height is a safe distance above the highest point of the upper surface of the wing of aircraft 10. When in the aircraft engaging position, the passageway 1 extends from the rotunda 4 and over the wing of aircraft 10, such that pivotal cabin 8 mates to the rear doorway 9.

Furthermore, some models of aircraft include winglets that are attached proximate a tip of the wing of the aircraft. Said winglets extend substantially above the highest point of the upper surface of the wing of aircraft 10. Accordingly, it is necessary in such cases for the height adjustable support post 19 of the wheel carriage to be adjusted in order to raise the passageway 1 to a height that provides a minimum safe clearance to the winglets, so as to avoid contact with the winglets when the passageway 1 is being moved approximately horizontally toward or away from the aircraft. Preferably, the minimum safe clearance to the highest point of the upper surface of the wing is substantially similar to the minimum safe clearance to the winglets, requiring the passageway 1 to be capable of being raised by an additional amount equal to the height of the winglets. Preferably, the height adjustable support post 19 includes a mechanical stop such that, in the event of a catastrophic failure of the over the wing bridge, the height adjustable support post 19 "bottoms out" prior to the passageway 1 coming into contact with the wing of the aircraft. In a most preferred embodiment, an adjustable mechanical stop is provided such that the "bottom out" position is variable in dependence upon the position of passageway 1. For instance, the passageway 1 may be raised to clear the winglet at the tip of an aircraft wing when being cantilevered over the wing. In such an instance, the "bottom out" position must be higher than the "bottom out" position that is required when the passageway 1 is over a flat portion of the wing. One solution is to provide an adjustable mechanical stop that "bottoms out" at a predetermined distance below a current bridge height, wherein the predetermined distance is less than the minimum safe clearance that is maintained between the passageway 1 and any surface of the aircraft wing. In a most preferred embodiment, the height adjustable support post 19 includes an electrical controller for providing an electronic "bottom out" point prior to the mechanical "bottom out" point. An adjustable mechanical stop as described above preferably includes a cam for automatically raising a support member disposed within and/or external to the height adjustable support post 19, during the period of time when the passageway 1 is being moved over the winglet. The mechanical stop optionally includes an electromagnetic screw for raising and lowering the passageway 1, and which provides a "hard stop" in an event that power to the screw is interrupted, for instance the screw does not "wind down" absent power being provided thereto.

Figure 2B:
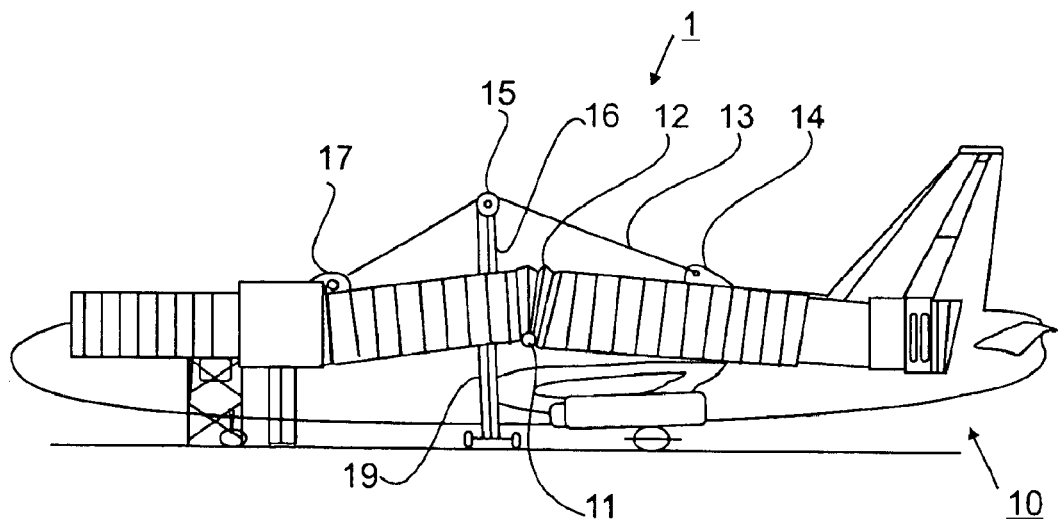

Referring to FIG. 2b, shown is a side view of the loading bridge illustrated in FIG. 2a. Elements labeled with the same numerals have the same function as those illustrated in FIG. 1b. As discussed supra, FIG. 2b shows the outboard end of passageway member 2 being elevated a safe distance above the highest point of the upper surface of the wing of aircraft 10. Advantageously, the wheel carriage supports the passageway member 2 at a point close to the leading edge of the aircraft wing, with the passageway member 2 extending only a short distance beyond. As such, the floor connector 11 of the flexible connection is substantially positioned above the highest point of the upper surface of the wing of aircraft 10. The support means adjust the height of the cabin end of the passageway 1 in order to mate the cabin 8 to the doorway 9, allowing the passageway 1 to maintain a predetermined threshold clearance above the rearwardly downwardly sloping contour of the wing.

Preferably, the telescopic tunnel section 21 is substantially collinear with the passageway member 2 during the period of time that the passageway 1 is being cantilevered over the wing of the aircraft 10. Optionally, the telescopic tunnel section 21 is locked at some predetermined angle relative to the passageway member 2, such that the passageway 1 clears the wing of aircraft 10. Said angle is variable in dependence upon whether or not the aircraft being serviced by the passageway 1 includes winglets attached near the tips of the wings. A sensor (not shown), preferably a plurality of sensors, including but not limited to laser range finders, echo sonography sensors, inductive proximity sensors, etc. are disposed along the passageway 1 in order to sense critical distances, such as for example a distance between an aircraft component and the passageway 1. In response to a sensor sensing an approach of a passageway section to within a predetermined threshold value, the sensor transmits a control signal to a bridge controller (not shown). The control signal is for initiating a corrective action, such as for instance one of moving the entire bridge away from the aircraft and stopping the motion of the bridge. Of course, once the cabin 8 is mated to the doorway 9 of the aircraft 10, the sensors continue to monitor critical distances as the aircraft is loaded and/or unloaded. Accordingly, the sensors also transmit automatic control signals for adjusting the relative positions of the tunnel segments as the aircraft raises and lowers during the above-mentioned operations, a function known as autoleveling.

Optionally, an automated bridge control system is provided for adjusting the relative positions of the tunnel segments during the initial process of aligning the cabin 8 to the doorway 9 of the aircraft 10. One such automated bridge control system is disclosed in the co-pending United States patent application discussed supra.

Optionally, a second telescopic passageway (not shown) replaces the fixed-length passageway member 2, such that the floor connector 11 may be positioned more precisely above the high point of the wing contour. This is particularly advantageous when a same bridge is used to service aircraft of different lengths. For example, a 737-900 is approximately 45 feet longer than a 737-100. In the 737-900 the front doorway is moved forward relative to the wing and the rear doorway is moved rearward relative to the wing, compared to the 737-100. Accordingly, when each aircraft is parked such that the front doorway thereof is aligned with the nose-loader bridge 30, the leading edge of the wing is more distant from the rotunda 4 in the case of the 737-900 than in the case of the 737-100. By extending the second telescopic passageway toward the wing of the 737-900, the support post 19 and the floor connector 11 are better positioned relative to the wing of the aircraft, and the length of the telescopic tunnel section when it is moved over the wing to engage the rear doorway is minimized.

Figure 8:
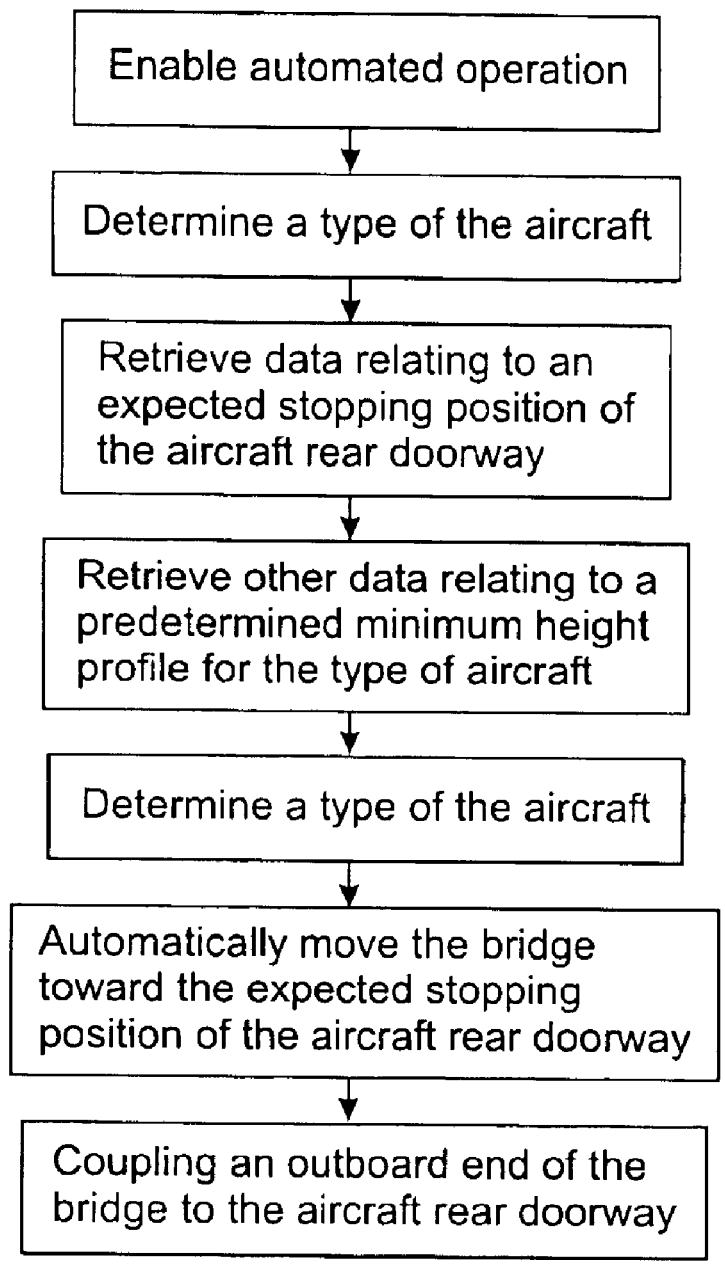
FIG. 8 shows a method of mating the over the wing loading bridge to the rear doorway of the aircraft, according to the instant invention.

Referring to FIG. 8, shown is a method of mating the over the wing loading bridge to the rear doorway of the aircraft, according to the instant invention. The over the wing loading bridge 1 occupies a stowed position prior to being used for servicing the aircraft 10, as shown in FIGS. 1a and 1b. When the aircraft 10 is assigned to a docking area adjacent the loading bridge 1, and when servicing of the rear doorway 9 is desired, a user of the bridge performs an optional step of enabling the automated bridge control system, to place the automated control system in a stand-by mode for aligning the cabin 8 of the loading bridge 1 with the rear doorway 9 of the aircraft 10. For instance, the user turns a key in a control panel or enters an alpha-numeric code via keypad of a control panel, to provide a control signal for enabling the automated bridge control system. Alternatively, the automated bridge control system remains in an enabled mode.

When enabled, a processor of the automated bridge control system performs a step of determining a type of the aircraft 10 to be serviced. For instance, the processor extracts data indicative of the type of aircraft from the control signal, and/or an imaging system of the control system captures an image of the aircraft 10 and extracts features from the image for comparison by the processor to template data stored in a local database, to thereby make an independent determination of the type of the aircraft 10. The template data preferably is stored locally to the processor, such that substantially autonomous operation of the loading bridge 1 is possible.

In a next step, the processor retrieves other data relating to a predetermined minimum height profile for allowing the passenger loading bridge to maintain a minimum safe distance relative to the wing of the aircraft. The predetermined minimum height profile relates to a height of a point along the lower surface of the passenger loading bridge, at which height every point along the lower surface of the passenger loading bridge is at least the minimum safe distance above a corresponding point on the wing of the aircraft. Optionally, the imaging system is used to confirm the presence of winglets and/or other features extending above the surface of the wing of aircraft 10. The processor automatically corrects the predetermined minimum height profile in the event that an unexpected feature, such as for instance a winglet, is detected. Once the aircraft 10 has come to a stop at an expected stopping position adjacent the loading bridge 1, the automated control system automatically moves the bridge toward the expected stopping position of the rear doorway 9 of the aircraft 10, which requires that the telescopic tunnel section be moved in a cantilever fashion over the upper surface of the wing of the aircraft. Accordingly, an initial movement of the loading bridge 1 is for elevating the loading bridge such that a point along the lower surface thereof is at least a predetermined distance above the corrected predetermined minimum height profile, so as to maintain a minimum safe distance between the loading bridge and the wing of the aircraft during subsequent movement of the loading bridge 1. For example, the processor provides a control signal to the height adjusted support post 19 to extend said post 19, so as to elevate the outboard end of the fixed-length passageway member 2 above the corrected predetermined minimum height profile.

Next, the processor provides a second control signal to the overhead support means. For example, a winch controller (not shown) receives the second control signal and is actuated to either wind or unwind cable, so as to vertically swing the cabin end of the telescopic tunnel section 21 relative to the fixed-length passageway member 2, about the floor connector 11 of the flexible connection. In such a position, the telescopic tunnel section 21 and the fixed-length passageway member 2 forms an arch with sufficient height to clear the wing of the aircraft, including the winglet when present.

The remaining movement of the loading bridge 1 toward the aircraft 10 is also controlled by the automated control system, in order to mate the cabin 8 to the rear doorway 9. Preferably, sensors disposed on and/or about the loading bridge sense distances between the loading bridge and plural surfaces of the aircraft 10, and provide electrical control signals useable by the processor of the automated control system for adjusting the bridge movement so as to avoid a collision between the loading bridge and the aircraft. Of course, once the cabin 8 is mated to the rear doorway 9, the same and/or different sensors sense distance information relating to the aircraft, in order to provide electrical control signals useable by the processor of the automated control system for adjusting the loading bridge 1 as the aircraft raises or lowers during an unloading or a loading operation.

Figure 3A:
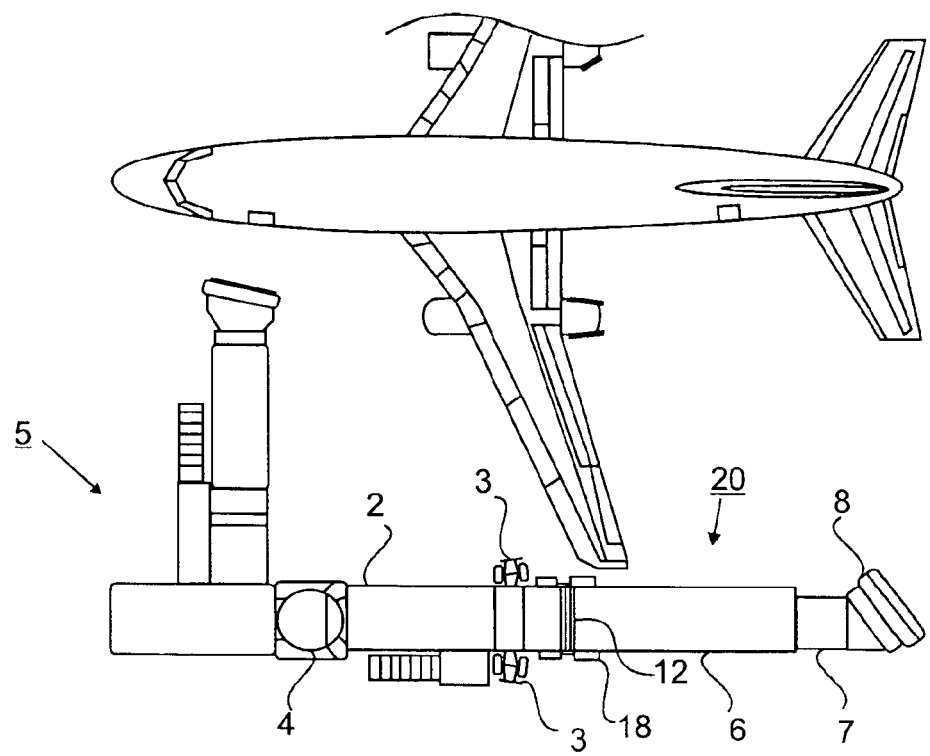
FIG. 3a is a top plan view showing a loading bridge according to a second embodiment of the instant invention in a stowed position relative to a nose-in parked aircraft.
Figure 3B:
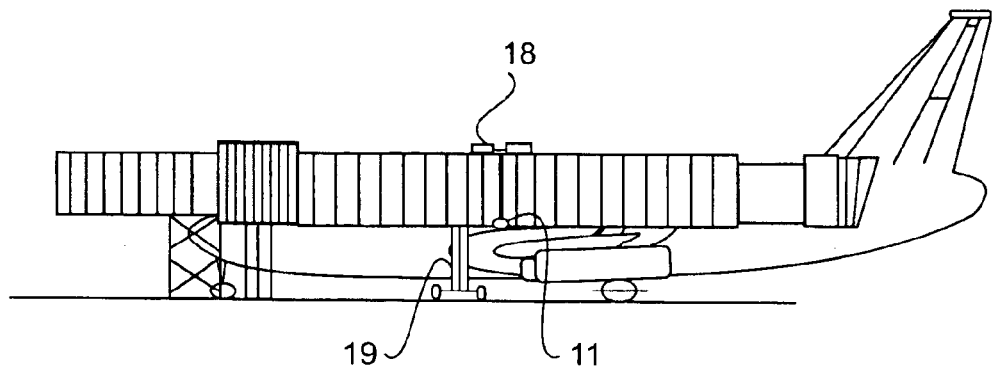

Referring to FIGS. 3a and 3b, shown is a loading bridge according to a second embodiment of the instant invention in a stowed position relative to a nose-in parked aircraft. Elements labeled with the same numerals have the same function as those illustrated in FIGS. 1a and 1b. According to the second embodiment, the overhead support means of FIG. 1b is replaced by a linear actuator comprising one of an extensible hydraulic cylinder 18 and an extensible electromechanical ball screw (not shown). Preferably, at least two linear actuators are provided, one adjacent to each opposing side surface of the passageway 1. The bridge 20 according to the second embodiment of the instant invention works in a manner substantially analogous to that of the first embodiment. Once the passageway is cantilevered over the wing of aircraft 10, the linear actuators 18 are actuated to raise or lower the cabin end of the passageway to the level of the rear doorway 9.

Figure 4A:
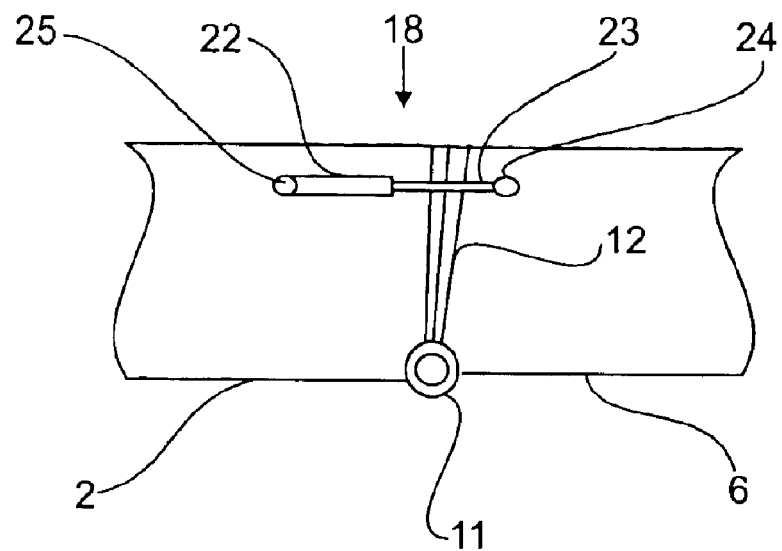
FIG. 4a is a detailed view of part of the loading bridge shown in FIG. 3a in a straight configuration.
Figure 4B:
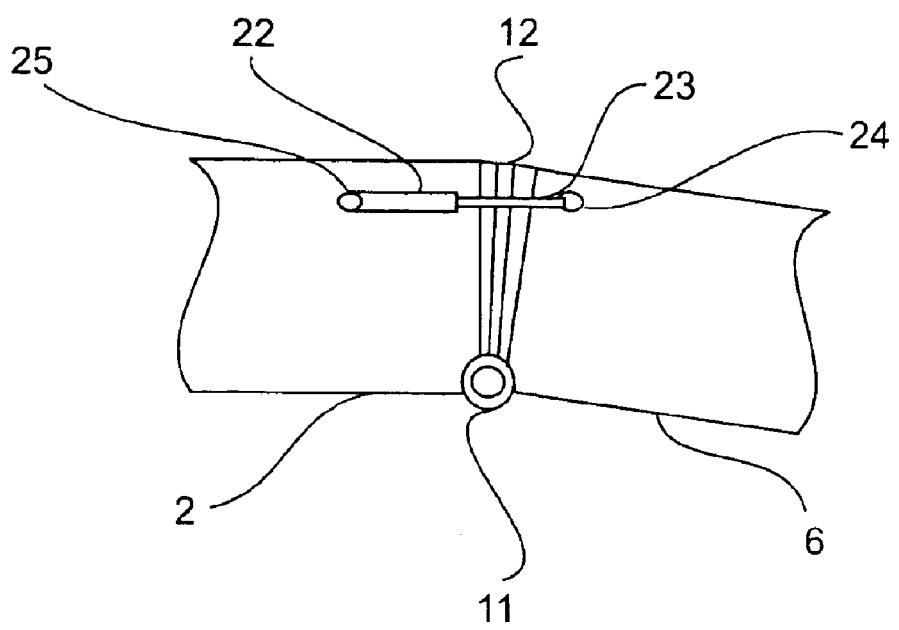
FIG. 4b is a detailed view of part of the loading bridge shown in FIG. 3a in a bent configuration.

Referring now to FIGS. 4a and 4b, detailed views of a linear actuator 18 in the form of a hydraulic cylinder 22 are shown. The hydraulic cylinder 22 is pivotally mounted to a sidewall surface of passageway member 2 using an anchor 25. An elongated piston 23 is telescopically received within the hydraulic cylinder 22 and is pivotally mounted to a sidewall surface of outer tunnel element 6 using an anchor 24. In FIG. 4a, the passageway member 2 is substantially longitudinally aligned with outer tunnel element 6. As shown in FIG. 4b, extending the piston causes the outboard end of tunnel element 6 to "lower". Accordingly, the height of the cabin end of passageway 1 is controllable by extending and retracting the piston.

Figure 3C:
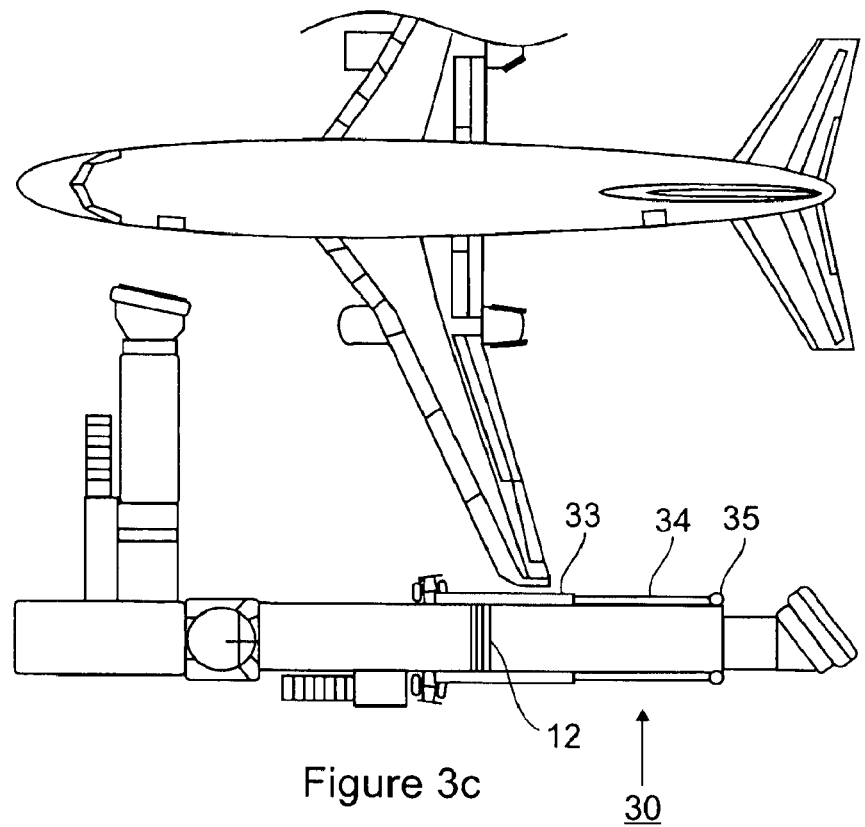
FIG. 3c is a top plan view showing a loading bridge according to a third embodiment of the instant invention in a stowed position relative to a nose-in parked aircraft.
Figure 3D:
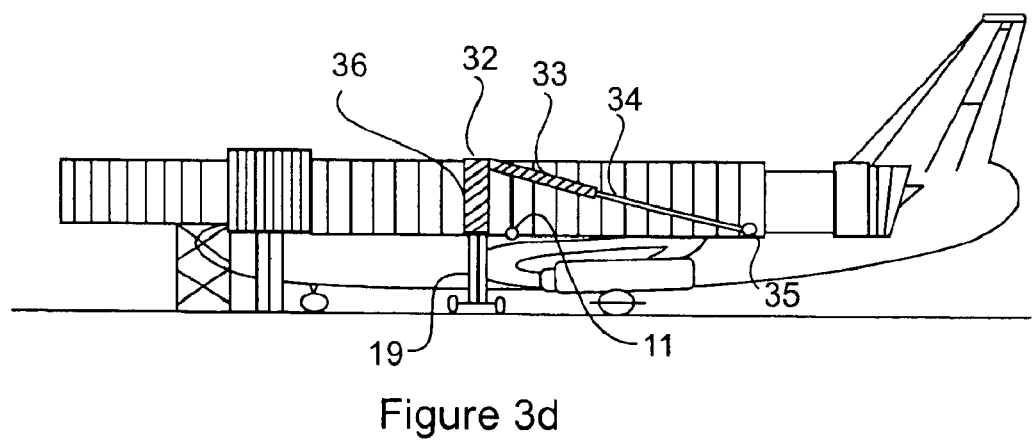
FIG. 3d is a side view of the loading bridge shown in FIG. 3c.

Referring to FIGS. 3c and 3d, shown is a loading bridge according to a third embodiment of the instant invention in a stowed position relative to a nose-in parked aircraft. The third embodiment is similar to the second embodiment. According to the third embodiment, a rigid support 36 extends upward from the wheel carriage support post 19, and adjacent a sidewall surface of passageway member 2. A hydraulic cylinder 33 is pivotally mounted close to the top of support 36 using an anchor 32. An elongated piston 34 is telescopically received within the hydraulic cylinder 33 and is pivotally mounted to a sidewall surface close to the outboard end of outer tunnel element 6 using an anchor 35. Preferably, anchor 35 is pivotally mounted to a rigid floor support member (not shown) of outer tunnel element 6.

It is an unforeseen advantage of the apparatus described with reference to FIGS. 1 to 4 that, by including the flexible connection between the passageway member 2 and the telescopic tunnel section 21, the passageway 1 is substantially more flexible compared to prior art over-the-wing bridges having a rigid, slightly arched shape. As such, the apparatus according to the instant invention is connectable between a wider range of fixed structure doorway heights and aircraft rear doorway heights compared to the prior art bridges. It is a further advantage of the instant invention that, by supporting the passageway member 2 using a moveable ground support member, such as a wheel carriage, only the telescopic tunnel section 21 needs to be supported, for example using overhead support means or linear actuators. As such, the support means may be considerably less complex, thereby reducing capital costs, avoiding construction of massive support structures, reducing maintenance costs and improving reliability.

Optionally, the telescopic tunnel section 21 includes more than two tunnel elements, for instance three tunnel elements. As will be obvious to one of skill in the art, additional tunnel elements extend the length of the passageway, thereby allowing the bridge to service rear doorways of stretch aircraft models, etc. Further optionally, additional flexible connections are provided along the length of the passageway, including mechanisms for changing the inclination of connected tunnel elements. For example, a flexible connection is provided between a first tunnel element and a second tunnel element and between the second tunnel element and a third tunnel element of a telescopic tunnel section comprising three tunnel elements. The additional flexibility of the passageway allows individual tunnel elements to be sloped less steeply, thereby improving accessibility and safety.

Of course, all embodiments illustrated above include a nose-loader type bridge for servicing a doorway in front of the wing of aircraft 10. Accordingly, following an initial connection operation, passengers may move quickly between a terminal building and the aircraft 10 via either one of the front and rear doorways. Preferably, airline employees direct a passenger to use one of the front doorway and the rear doorway, depending upon a predetermined seating assignment of the passenger, so as to avoid unnecessary intermingling of passengers along the airplane aisle or aisles. Optionally, an automated system including signs, boarding pass scanners, etc. is used to direct passenger travel flow onto and/or off of the aircraft 10. Further optionally, one of a radial type bridge and an apron drive bridge is provided in place of the nose-loader, as discussed in greater detail with reference to FIG. 5 and FIG. 6, respectively, below.

As noted above, the front doorways of aircraft are often moved forward relative to the wing as the overall length of the aircraft increases. This is in addition to the rear doorways being moved rearward relative to the wing. Accordingly, it would be advantageous to provide an apparatus having a passenger loading bridge that can be pivoted and extended in order to engage a front doorway of plural types of aircraft, each type of aircraft being of a different length, thereby minimizing the amount of extension of an over the wing bridge potion that is required to engage a rear doorway of a same type of aircraft.

Figure 5:
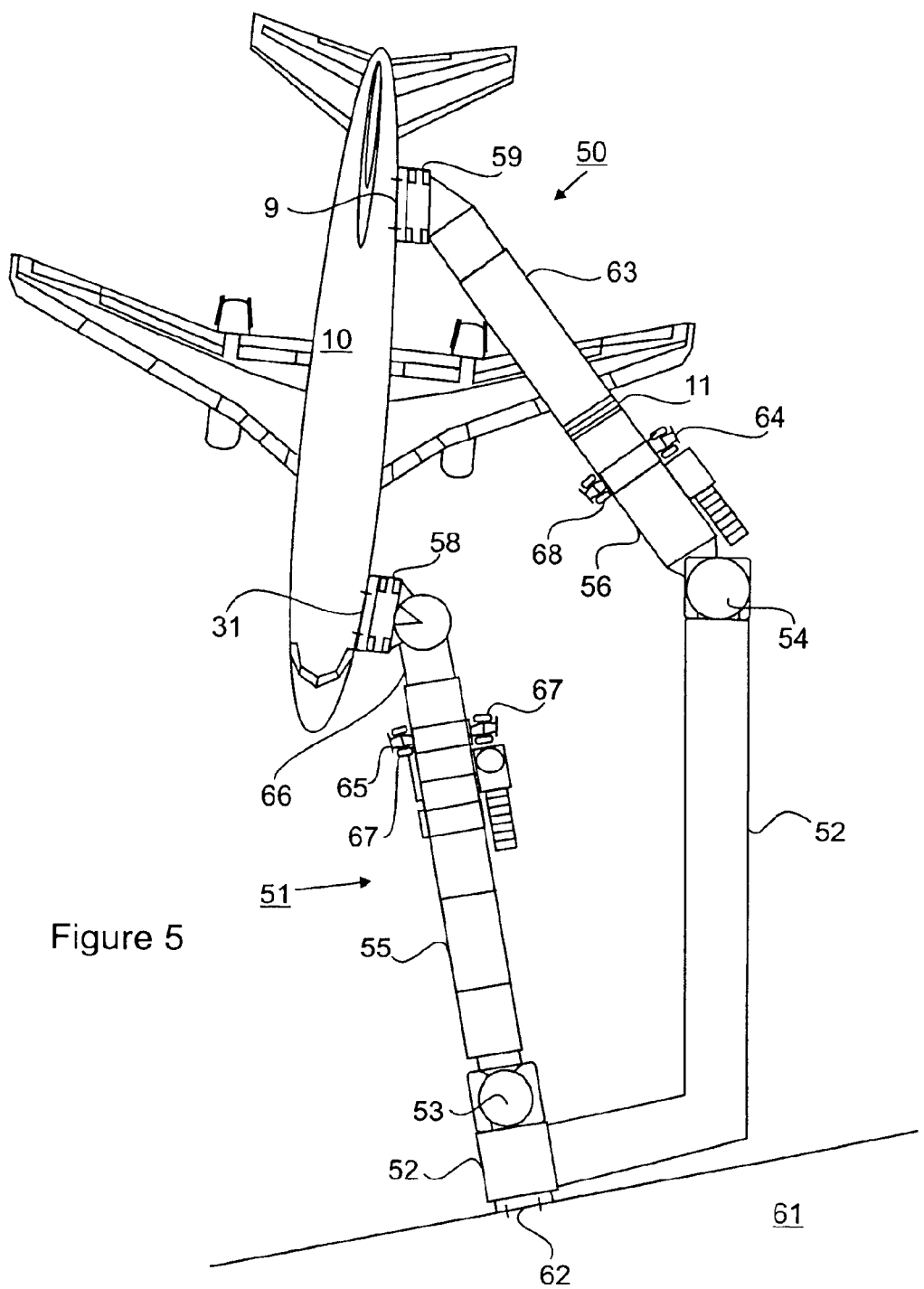
FIG. 5 is a top plan view of an aircraft loading apparatus according to the instant invention.

Referring to FIG. 5, shown is a top plan view of an aircraft loading apparatus according to the instant invention. The apparatus includes an over the wing portion shown generally at 50 for servicing a rear doorway 9 of a nose-in parked aircraft 10 at a terminal building 61. The apparatus further includes a radial type bridge portion shown generally at 51 for servicing a front doorway 31 of the nose-in parked aircraft 1O. The over the wing portion 50 and the radial type bridge portion 51 are coupled via a unitary passageway element 52 to each other and to an access portal 62 of the terminal building 61.

The over the wing portion 50 comprises a first passageway member 56 pivotally mounted at an inboard end to a rotunda 54 and supported near an outboard end by a wheel carriage 64 having a height adjustable support member (not shown) and driving wheels 68 for achieving angular displacement of the over the wing portion 50. The first passageway member 56 is also pivotally coupled at the outboard end to a telescopic passageway member 63 via a flexible floor connection 11 for allowing a vertical swinging motion of the telescopic passageway member 63, to align a cabin 59 mounted at an outboard end of the telescopic passageway member 63 with the doorway 9. Support means (not shown) are provided for adjustably controlling the vertical swinging motion. Of course, other mechanisms (not shown) are provided for adjusting the height of the over the wing portion 50, for extending and retracting the telescopic passageway member 63, etc. In a preferred embodiment, the over the wing portion 50 is aligned with the doorway 9 in an automated fashion. To this end, a bridge controller (not shown) is also provided for receiving data from sensors (not shown) mounted on or about the over the wing portion 50 and for providing control signals to the mechanisms. In a preferred embodiment, the portion 50 is aligned with the doorway 9 absent any human intervention. In another preferred embodiment, a human operator is required to perform one of an enable and a disable operation prior to the portion 50 being aligned to the doorway 9. For instance, the human operator turns a key in a control panel (not shown) or enters an alphanumeric code via a key pad (not shown) to enable the automated alignment system. In particular, flights that are only partially full may not require use of the over the wing portion 50, or alternatively certain airlines may not approve use of the over the wing portion with their aircraft. Of course, optionally the cabin 59 is pivotally mounted at the outboard end of the over the wing portion 50.

The radial type bridge portion 51 includes a fixed-length passageway member 55, which is mounted at an inboard end thereof to a rotunda 53 and supported at an outboard end by a wheel carriage 65 having a height adjustable support member (not shown) and driving wheels 67 for achieving angular displacement of the radial type bridge portion 51. The fixed-length passageway member 55 is telescopically coupled to a second passageway member 66, such that the length of the radial type bridge portion 51 is variable. A cabin 58 is mounted at an outboard end of the second passageway member 66 for engaging the doorway 31. The radial type bridge portion 51 is aligned to the doorway 31 in one of a manual, semi-automated, tele-robotic and automated manner. Optionally, a bridge controller (not shown) is also provided for receiving data from sensors (not shown) mounted on or about the radial bridge type portion 51 and for providing control signals to the mechanisms. Of course, a number of passageway member-s other than two may be envisaged for use with the radial type bridge portion 51 of instant invention.

Figure 6:
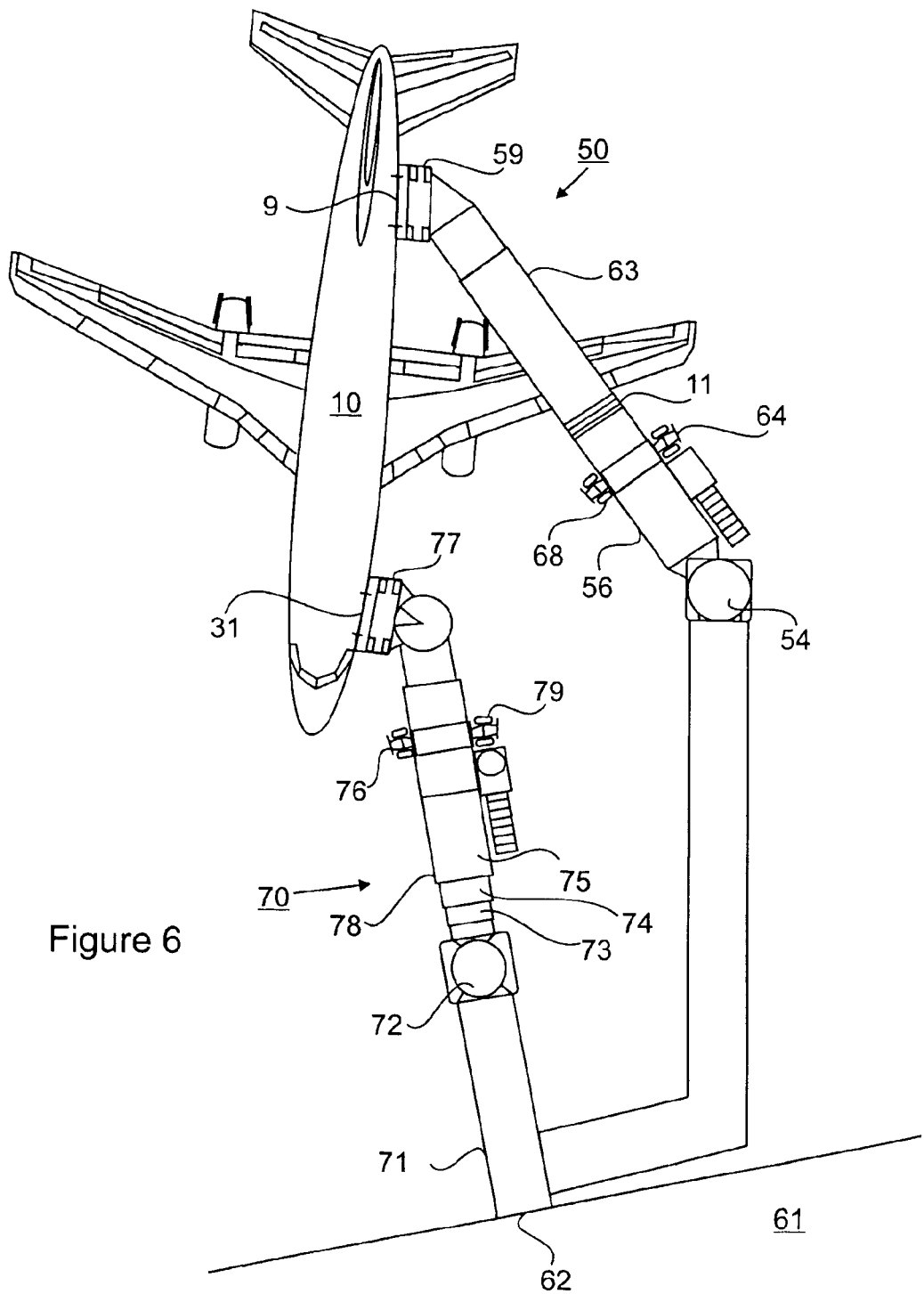
FIG. 6 is a top plan view of another aircraft loading apparatus according to the instant invention.

FIG. 6 is a top plan view of another aircraft loading apparatus according to the instant invention. Elements labeled with the same numerals have the same function as those illustrated in FIG. 5, and their description is omitted here for clarity. The apparatus includes an over the wing portion shown generally at 50 for servicing a rear doorway 9 of a nose-in parked aircraft 10 at a terminal building 61. The apparatus further includes an apron bridge portion shown generally at 70 for servicing a front doorway 31 of the nose-in parked aircraft 10. The over the wing portion 50 and the apron bridge portion 70 are coupled via a unitary passageway element 71 to each other and to an access portal 62 of the terminal building 61.

The apron drive portion 70 includes a telescopic passageway member 78 comprising three passageway elements. Of course a number of passageway elements other than three may be envisaged for use with the instant invention. A first passageway element 73 is mounted at an inboard end to a rotunda 72. An outboard end of the first passageway element 73 is telescopically received within an inboard end of a second passageway element 74, and an outboard end of the second passageway element 74 is telescopically received within an inboard end of a third passageway element 75. The third passageway element 75 is supported near an outboard end thereof by a wheel carriage 76 having a height adjustable support member (not shown) and driving wheels 79 for achieving angular displacement of the apron drive portion 70 as well as telescoping of the passageway elements 73, 74 and 75 to alter the length of the apron drive portion 70. A cabin 77 is mounted at an outboard end of the third passageway element 75 for engaging the doorway 31. Optionally, the cabin 77 is pivotally mounted at the outboard end of the third passageway element 75 and a mechanism (not shown) is provided for adjusting the orientation of the cabin relative to the third passageway element 75. The apron drive portion 70 is aligned to the doorway 31 in one of a manual, semi-automated, tele-robotic and automated manner. Optionally, a bridge controller (not shown) is also provided for receiving data from sensors (not shown) mounted on or about the apron drive portion 70 and for providing control signals to the mechanisms.

Of course, other known configurations of apron drive bridges are also envisaged for use with the instant invention. For instance, an apron drive bridge including at least two passageway members, one telescopically received within the other, is suitable for use with the instant invention.

Figure 7A:
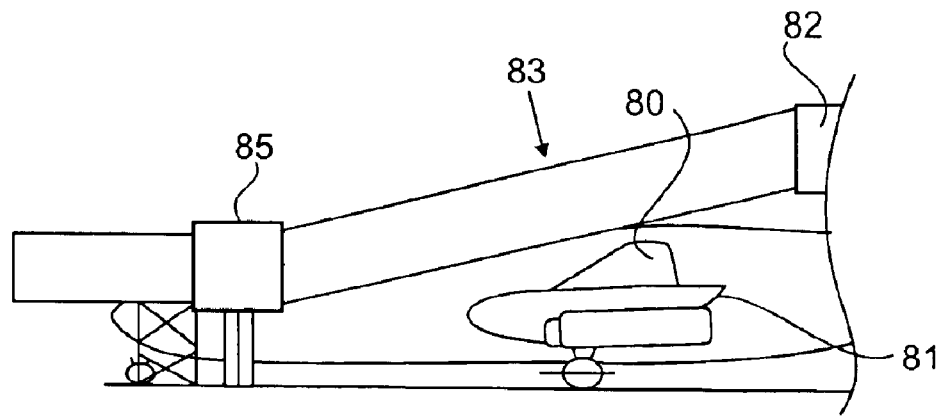
FIG. 7a is a side view of a prior art over the wing bridge being cantilevered over a wing of an aircraft equipped with winglets.
Figure 7B:
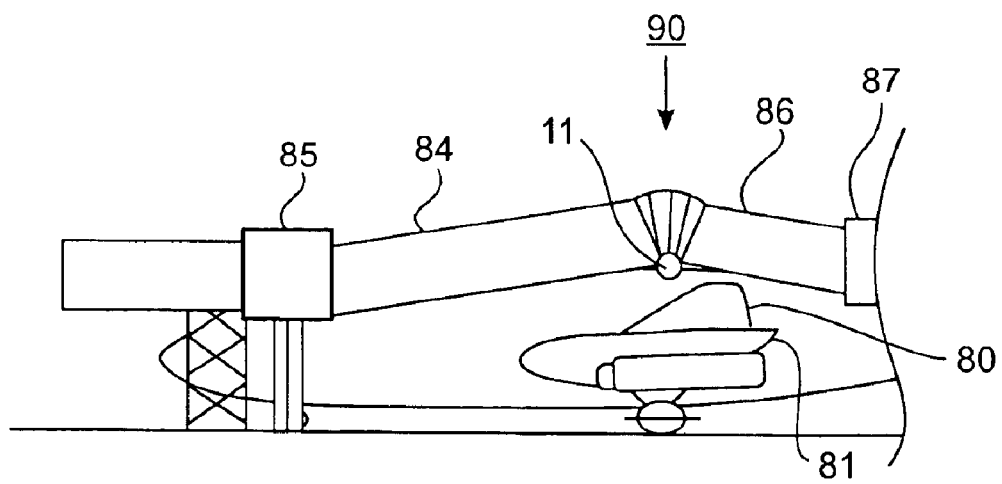
FIG. 7b is a side view of an over the wing bridge according to the instant invention, being cantilevered over a wing of an aircraft equipped with winglets.

The instant invention described above with reference to FIGS. 1–6 discloses an over the wing bridge for servicing a rear doorway of an aircraft, wherein a flexible floor connection 11 is provided between a first passageway member and a telescopic passageway member of a passageway. It is an advantage of the instant invention that the flexible floor connection is positionable close to the leading edge and/or highest point of the wing contour, such that the passageway may be cantilevered over the wing of the aircraft to engage the rear doorway thereof, whilst maintaining a safe clearance distance between the wing surface and the passageway. It is a further advantage that, when used in connection with an aircraft having winglets 80 attached near a tip of each wing 81, the bridge may still be cantilevered over the wing without requiring the cabin end of the bridge to project substantially into the air. In fact, the tops of the winglets of a 737 type aircraft are approximately 20 feet above the ground. Referring now to FIG. 7a, shown is a prior art over the wing bridge 83 being cantilevered over the wing 81 of an aircraft having winglets 80 attached thereto. The cabin end 82 of the non-flexible over the wing bridge 83 extends substantially higher than the tops of the winglets. This situation is undesirable, especially when operating under windy or adverse conditions. Referring now to FIG. 7b, shown is a flexible over the wing bridge 90 according to the instant invention being cantilevered over the wing 81 of an aircraft having winglets 80 attached thereto. A first passageway member 84 slopes upward from a rotunda 85 to a height for providing safe clearance to the winglet 80, and the flexible floor connection 11 allows the telescopic passageway member 86 to swing vertically downward from said height, such that the cabin end 87 is approximately 20 feet above the ground or less.

Optionally, the invention according to any of the above-described embodiments is operable in an automated manner, for example by providing an automated bridge control system. One such automated bridge control system is disclosed in the co-pending United States patent application discussed supra. Of course, each one of the above-mentioned apparatus includes a first moveable bridge for servicing a front doorway of an aircraft and an over the wing bridge for servicing a rear doorway of a same aircraft. The first moveable bridge and/or the over the wing bridge are alignable to the corresponding doorway of the same aircraft in one of a manual fashion and an automated fashion. Advantageously, the first moveable bridge may be aligned to the front doorway of the aircraft in the automated fashion using the automated bridge control system, once the aircraft has come to a stop and absent any ground personnel intervention. A member of the flight crew of the aircraft then optionally deplanes via the front doorway and enables the automated bridge control system to align the over the wing bridge to the rear doorway of the same aircraft.

Preferably, the height adjustable support member for adjusting the vertical position of the over the wing portion includes a mechanical stop, such that in the event of a catastrophic failure the height adjustable support member "bottoms out" prior to the over the wing portion coming into contact with the wing of the aircraft. In a most preferred embodiment, an adjustable mechanical stop is provided such that the "bottom out" height is variable in dependence upon the bridge position. For instance, the over the wing portion may be raised to clear a winglet at the tip of an aircraft when being cantilevered over the wing. In such an instance, the bottom out position must be higher than the bottom out position that is required when the bridge is over a flat portion of the wing. One solution is to provide an adjustable mechanical stop that bottoms out a predetermined distance below a current bridge height, wherein the predetermined distance is less than the minimum safe clearance that is maintained between the bridge and a portion of the aircraft.

Numerous other embodiments may be envisaged without departing from the spirit and scope of the invention.

What is claimed is:

1. A method of automatically aligning a passenger loading bridge to an aircraft having a rear doorway aft of or over a wing, comprising:
   a) automatically determining a type of the aircraft;
   b) retrieving information relating to an expected stopping position for the rear doorway of the determined type of the aircraft;
   c) retrieving other information relating to a predetermined minimum height profile for allowing the passenger loading bridge to maintain a desired minimum safe distance relative to the wing of the aircraft;
   d) waiting for the aircraft to stop;
   e) automatically moving an aircraft engaging end of the passenger loading bridge toward the expected stopping position of the rear doorway for the determined type of the aircraft; and f) moving an outboard portion of the passenger loading bridge relatively to an inboard portion of the passenger loading bridge about a first flexible connection disposed therebetween, and adjusting a height of the first flexible connection by pivoting the inboard portion of the passenger loading bridge about a second flexible connection, such that during (e) a point along the lower surface of the passenger loading bridge remains above the predetermined minimum height profile of the wing of the aircraft.

2. A method according to claim 1 wherein the predetermined minimum height profile relates to a height of the point along the lower surface of the passenger loading bridge, at which height every point along the lower surface of the passenger loading bridge is at least the desired minimum safe distance above a corresponding point on the wing of the aircraft.

3. A method according to claim 1 including:
coupling the aircraft engaging end of the passenger loading bridge to the rear doorway of the aircraft;
when coupled, sensing a vertical displacement of the wing of the aircraft relative to the passenger loading bridge; and
automatically moving the passenger loading bridge in dependence upon the sensed vertical displacement of the wing, so as to maintain the desired minimum safe distance between the wing of the aircraft and the passenger loading bridge.

4. A method according to claim 1 including coupling the aircraft engaging end of the passenger loading bridge to the rear doorway of the aircraft, wherein, when coupled, the outboard portion of the passenger loading bridge is aligned substantially parallel to an upper surface of the wing of the aircraft.

5. A method according to claim 1 including prior to determining a type of the aircraft:
waiting to receive a control signal for enabling an automated bridge control system to automatically align the passenger loading bridge to the rear doorway of the aircraft.

6. A method according to claim 5 wherein determining a type of the aircraft includes:
a1) in dependence upon receiving the control signal, capturing an image of the aircraft;
a2) characterizing the image of the aircraft to extract features relating to the aircraft;
a3) comparing the extracted features with stored template features; and,
a4) identifying the type of the aircraft in dependence upon a result of the comparison.

7. A method according to claim 5 wherein determining a type of the aircraft includes:
a1) extracting from the control signal, data relating to the type of the aircraft; and
a2) based on the extracted data, identifying the type of the aircraft.

8. A method according to claim 1 including prior to waiting for the aircraft to stop:
c1) moving the passenger loading bridge to a predetermined pre-position for avoiding contact with determined type of the aircraft.

9. A method according to claim 1 wherein automatically moving an aircraft engaging end of the passenger loading bridge toward the expected stopping position of the rear doorway for the determined type of the aircraft includes:

e1) positioning the flexible connection of the passenger loading bridge approximately above a leading edge of the wing of the aircraft and at a height that is sufficient for allowing the point along the lower surface of the passenger loading bridge to remain above the predetermined minimum height profile of the wing of the aircraft.

10. A method according to claim 1 wherein automatically moving an aircraft engaging end of the passenger loading bridge toward the expected stopping position of the rear doorway for the determined type of the aircraft includes:
e1) sensing a distance between the passenger loading bridge and the aircraft;
e2) comparing the sensed distance to the desired minimum safe distance; and
e3) when the sensed distance is i) one of greater than and equal to the desired minimum safe distance, continuing the movement of the bridge toward the expected stopping position of the rear doorway for the determined type of aircraft, and ii) less than the desired minimum safe distance, moving the bridge along a predetermined escape route in a direction away from the aircraft.

11. A method according to claim 1 wherein automatically moving an aircraft engaging end of the passenger loading bridge toward the expected stopping position of the rear doorway for the determined type of the aircraft includes:
e1) sensing a distance between the passenger loading bridge and the aircraft;
e2) comparing the sensed distance to the desired minimum safe distance; and
e3) when the sensed distance is i) one of greater than and equal to the desired minimum safe distance, continuing the movement of the bridge toward the expected stopping position of the rear doorway for the determined type of aircraft, and ii) less than the desired minimum safe distance, correcting the predetermined minimum height profile such that, during future motion, the sensed distance is at least equal to the desired minimum safe distance.

12. A method of automatically aligning a passenger loading bridge to an aircraft having a rear doorway aft of or over a wing, comprising:
adjusting a height of a flexible connection disposed between an outboard portion and an inboard portion of the passenger loading bridge to a first height;
adjusting a height of an aircraft engaging end of the passenger loading bridge by relatively moving the outboard portion and the inboard portion of the passenger loading bridge about the flexible connection, so as to adjust an angle between the outboard portion and the inboard portion of the passenger loading bridge about the flexible connection while maintaining the flexible connection at approximately the first height; and,
moving the aircraft engaging end over the wing of the aircraft in a direction that is toward the rear doorway of the aircraft.

13. A method according to claim 12, wherein the first height is selected to provide a desired minimum safe distance between an upper surface of the wing of the aircraft and the passenger loading bridge.

14. A method according to claim 12, wherein the first height is a height that is above an upper surface of the wing of the aircraft.

15. A method according to claim 14, wherein the first height is selected to provide a desired minimum safe distance between the upper surface of the wing of the aircraft and the passenger loading bridge.

16. A method according to claim 12, comprising:

controllably varying a length of the outboard portion of the passenger loading bridge such that the aircraft engaging end is substantially aligned with the rear doorway of the aircraft.

17. A method according to claim 16, comprising:

coupling the aircraft engaging end of the passenger loading bridge with the rear doorway of the aircraft, so as to support passenger movement therebetween.

18. A method according to claim 12, comprising:

coupling the aircraft engaging end of the passenger loading bridge with the rear doorway of the aircraft, so as to support passenger movement therebetween.

19. A method according to claim 17, comprising:

when coupled, sensing a vertical displacement of the wing of the aircraft relative to the passenger loading bridge; and automatically moving the passenger loading bridge in dependence upon the sensed vertical displacement of the wing, so as to maintain a desired minimum safe distance between the wing of the aircraft and the passenger loading bridge.

20. A method according to claim 12, comprising:

positioning the flexible connection of the passenger loading bridge approximately vertically above a leading edge of the wing of the aircraft.

\* \* \* \* \*